United States Patent
Sichi et al.

(10) Patent No.: US 7,941,398 B2
(45) Date of Patent: May 10, 2011

(54) AUTOPROPAGATION OF BUSINESS INTELLIGENCE METADATA

(75) Inventors: John V. Sichi, Half Moon Bay, CA (US); Benny T. Chow, Fremont, CA (US); Vishwas S. Agashe, San Ramon, CA (US); Chetan R. Kadam, San Francisco, CA (US); Quoc T. Tran, Mountain View, CA (US); Ken M. Rudin, Palo Alto, CA (US)

(73) Assignee: Pentaho Corporation, Orlando, FL (US)

( * ) Notice: Subject to any disclaimer, the term of this patent is extended or adjusted under 35 U.S.C. 154(b) by 331 days.

(21) Appl. No.: 11/904,632

(22) Filed: Sep. 26, 2007

(65) Prior Publication Data

US 2009/0083306 A1    Mar. 26, 2009

(51) Int. Cl.
   *G06F 7/00* (2006.01)
(52) U.S. Cl. ........ 707/602; 707/755; 707/756; 707/770; 705/1; 705/7; 705/8
(58) Field of Classification Search ............... 707/1, 10, 707/100–102, 602, 755, 756, 770; 705/1, 705/7–8
   See application file for complete search history.

(56) References Cited

U.S. PATENT DOCUMENTS

| | | | |
|---|---|---|---|
| 5,715,453 A * | 2/1998 | Stewart | 715/207 |
| 6,823,359 B1 * | 11/2004 | Heidingsfeld et al. | 709/203 |
| 7,191,183 B1 * | 3/2007 | Goldstein | 707/101 |
| 7,444,342 B1 * | 10/2008 | Hall et al. | 707/100 |
| 7,546,226 B1 * | 6/2009 | Yeh et al. | 703/2 |
| 2002/0099563 A1 * | 7/2002 | Adendorff et al. | 705/1 |
| 2003/0220860 A1 * | 11/2003 | Heytens et al. | 705/35 |
| 2005/0033726 A1 * | 2/2005 | Wu et al. | 707/1 |
| 2005/0071842 A1 * | 3/2005 | Shastry | 718/100 |
| 2005/0228803 A1 * | 10/2005 | Farmer et al. | 707/100 |
| 2005/0262087 A1 * | 11/2005 | Wu et al. | 707/9 |
| 2005/0278270 A1 * | 12/2005 | Carr et al. | 706/25 |
| 2006/0089939 A1 * | 4/2006 | Broda et al. | 707/100 |
| 2006/0112110 A1 * | 5/2006 | Maymir-Ducharme et al. | 707/100 |
| 2006/0112123 A1 * | 5/2006 | Clark et al. | 707/101 |
| 2006/0136436 A1 * | 6/2006 | Aftab et al. | 707/100 |
| 2006/0212486 A1 * | 9/2006 | Kennis et al. | 707/200 |
| 2006/0212487 A1 * | 9/2006 | Kennis et al. | 707/200 |
| 2007/0022093 A1 * | 1/2007 | Wyatt et al. | 707/2 |
| 2007/0038683 A1 * | 2/2007 | Dixon et al. | 707/202 |
| 2007/0226196 A1 * | 9/2007 | Adya et al. | 707/3 |
| 2007/0299885 A1 * | 12/2007 | Pareek et al. | 707/202 |

(Continued)

OTHER PUBLICATIONS

Kirkham et al.—"A Business service network to aid collaboration between Small Medium Enterprises"—E-Commerce technology, 2006, The 8th IEEE International conference. Jun. 26-29, 2006 (pp. 1-7).*

(Continued)

*Primary Examiner* — John E Breene
*Assistant Examiner* — Anh Ly
(74) *Attorney, Agent, or Firm* — Goodwin Procter LLP

(57) ABSTRACT

A method of processing data is disclosed. A data field change is detected in a received data entry received by a business intelligence application. A shared metadata entry shared by two or more business intelligence application stack elements is processed to derive for each of at least a subset of said two or more business intelligence application stack elements a corresponding set of element specific metadata needed by that element to use a data value associated with the data field change.

16 Claims, 10 Drawing Sheets

U.S. PATENT DOCUMENTS

| | | | |
|---|---|---|---|
| 2008/0071844 A1* | 3/2008 | Gopal et al. | 707/204 |
| 2008/0140692 A1* | 6/2008 | Gehring | 707/101 |
| 2008/0195651 A1* | 8/2008 | Rachmiel et al. | 707/102 |
| 2008/0270362 A1* | 10/2008 | Yamaguchi et al. | 707/3 |
| 2008/0270363 A1* | 10/2008 | Hunt et al. | 707/3 |
| 2008/0288448 A1* | 11/2008 | Agredano et al. | 707/2 |

OTHER PUBLICATIONS

Azvine et al.—"Real Time Business Intelligence for adaptive Enterprise"—E-commerce technology, 2006. The $8^{th}$ IEEE International Conference, Jun. 26-29, 2006 (pp. 1-8).*

* cited by examiner

AUTOPROPAGATION OF BUSINESS INTELLIGENCE METADATA

BACKGROUND OF THE INVENTION

Business intelligence applications allow a company to perform tasks such as gathering data from heterogeneous sources, analyzing such data, and producing reports. Traditionally, a business intelligence application includes one or more stack elements configured to perform data retrieval, integration, management, and/or reporting functions. The stack elements typically require some knowledge of the structure and content of data available from various sources, and as a result under existing approaches considerable administrative effort may be required to enable a typical business intelligence application to use (e.g., include in a proper or desired way in a report) data associated with a data field newly added at a source.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
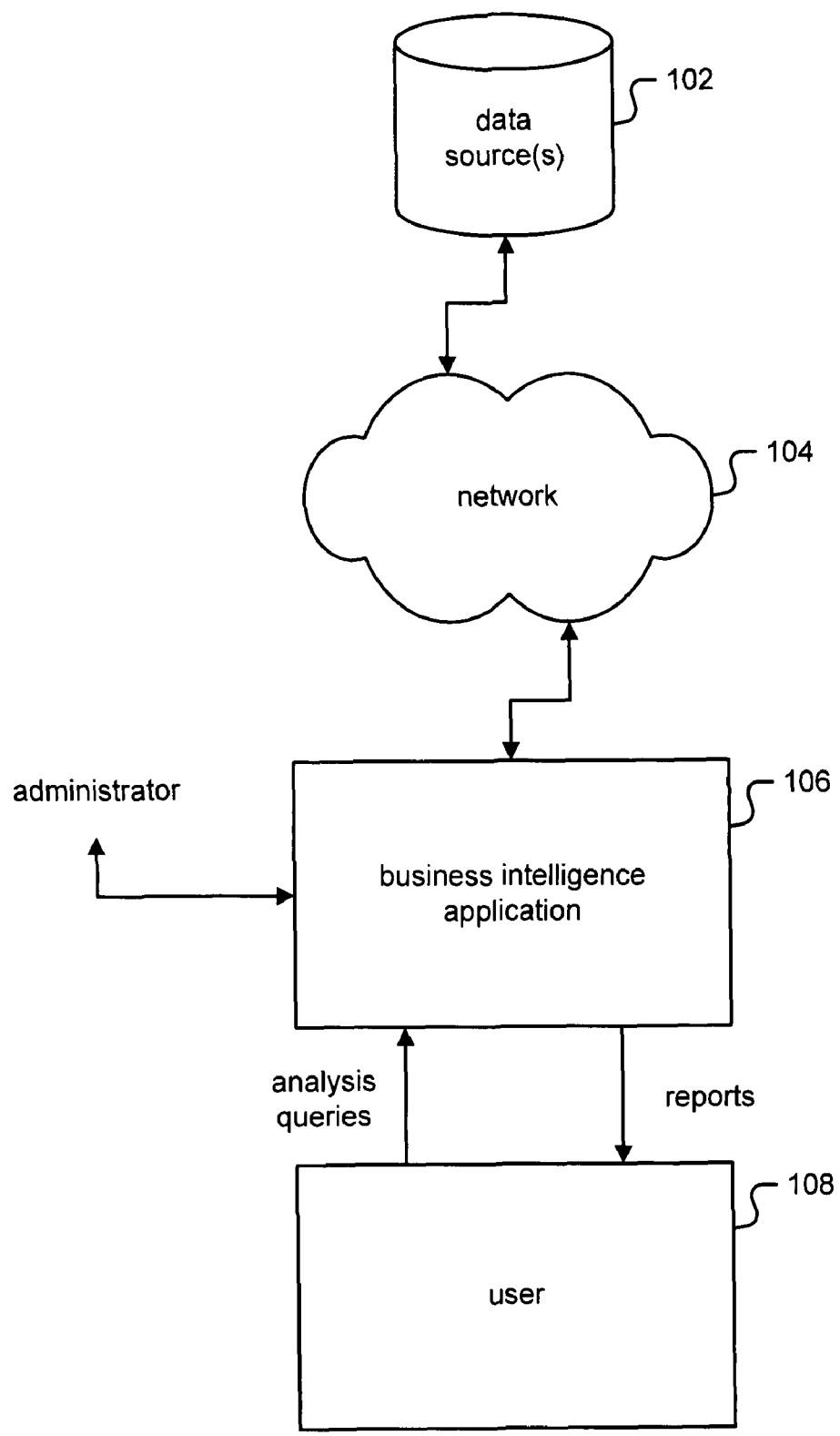
FIG. 1 is a block diagram illustrating an embodiment of a business intelligence application and/or system and associated elements.

FIG. 1 is a block diagram illustrating an embodiment of a business intelligence application and/or system and associated elements. Data source 102 provides a source of business-related data. Examples of sources of business related data source 102 include a database provided by a sales-force automation ("SFA") vendor, a customer relationship management ("CRM") vendor, an accounting management vendor, or an enterprise resource planning ("ERP") vendor. In some embodiments, there may be more than one data source 102.

In the example shown, a data source 102 is coupled to a network 104; a public or private network and/or combination thereof, for example the Internet, an Ethernet, serial/parallel bus, intranet, NAS, SAN, LAN, WAN, and other forms of connecting multiple systems and/or groups of systems together. Business intelligence application ("BIA") 106 receives data from one or more database sources 102 through network 104. BIA 106 extracts, warehouses, and analyzes the data; accepts analysis queries from user 108; and delivers reports to user 108. In some embodiments, there may be more than one user 108. In some embodiments, a BIA administrator maintains the BIA 106 and troubleshoots any problems.

Figure 2:
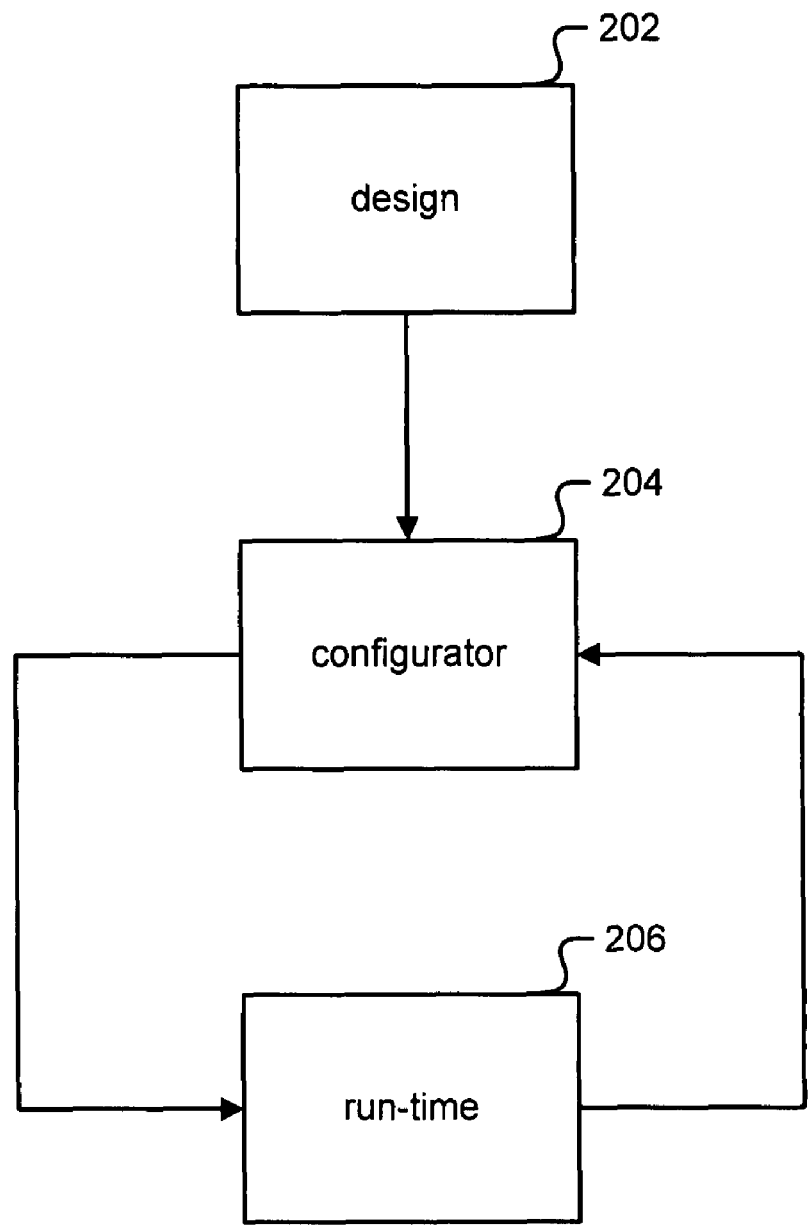
FIG. 2 is a block diagram illustrating an embodiment of a process for a business intelligence application lifecycle.

FIG. 2 is a block diagram illustrating an embodiment of a process for a business intelligence application lifecycle. The process may be implemented in BIA 106.

In step 202, an application developer designs BIA 106, taking into consideration the requirements of user 108 that are known at design time for data sources 102, analysis queries, and reports. The application developer defines data flows between the internal components of BIA 106. Examples of a data flow include a path that starts with a particular data field or type of data field associated with one or more data sources and indicates intermediate processing, if any, done on and/or with respect to data values associated with the field or type of field and one or more outputs, e.g., how the data, as processed if applicable, is provided as output, e.g., in a report.

In step 204, the BIA enters a "configurator" mode, which allows the BIA to adapt to its initial or a changed environment. In some embodiments, a changed environment may involve a data field change in a data source 102, for example the introduction of a data field for a customer size in a opportunity database entry for a CRM vendor 102. In this example, the configurator mode will identify the new customer size field, and reconfigure the BIA 106 to correctly analyze and produce reports that include the customer size field.

In step 206, the BIA 106 enters its normal "run-time" mode, in which a data source 102 is accessed to answer queries from user 108 and produce reports to user 108. In some embodiments, the BIA 106 may reenter the configurator mode 204 to further analyze any changed data fields at a scheduled time or as the administrator requests it.

Figure 3A:
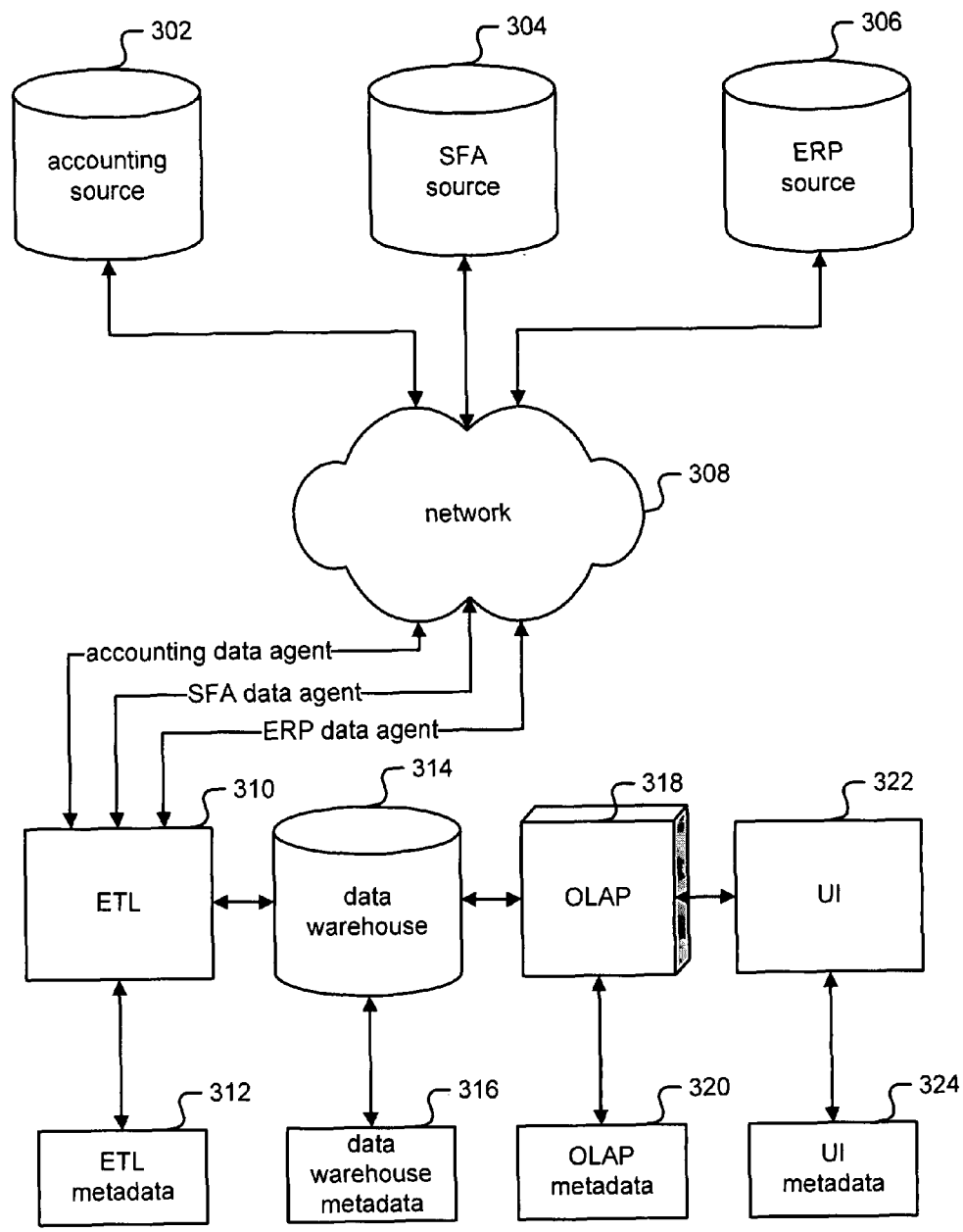
FIG. 3A is a block diagram illustrating an example of a system for a typical business intelligence application run-time flow.

FIG. 3A is a block diagram illustrating an example of a system for a typical business intelligence application run-time flow. Accounting source 302, SFA source 304 and ERP source 306 each represent a source database for analysis and reporting. The three sources shown in FIG. 3A are only examples, and other sources may be available, for example CRM sources. The sources are connected through network 308 to an Extract, Transform, Load ("ETL") system 310, via data agents specifically customized for each source, for example an accounting data agent connects accounting source 302 with ETL 310. Besides the core data transported from source to ETL 310, metadata is any additional data required for adjusting content or form of the core data. ETL metadata is stored in an ETL metadata repository 312.

The ETL 310 is connected to a data warehouse system 314, which warehouses data for future analysis and reports. The data agents may also be connected through to other components, for example data warehouse system 314. Data warehouse metadata is stored in a data warehouse metadata repository 316. Examples of data warehouse metadata include table schema for each table in the data warehouse. The data warehouse 314 is also connected to an Online Analytical Processing ("OLAP") cube, which analyzes data and prepares reports using a multidimensional approach. OLAP metadata is stored in an OLAP metadata repository 320. Examples of OLAP metadata include the eXtended Markup Language ("XML") files to configure the cubes and analysis. The OLAP cube 318 is also connected to a User Interface ("UI") system 322. The UI 322 presents the analyzed data and reports from OLAP cube 318 to a user 108. UI metadata is stored in a UI metadata repository 324.

Conventionally, the ETL 310, data warehouse 314, OLAP cube 318 and UI 322 all store metadata in the corresponding local metadata repository. When a data field change occurs in any of the source databases 302, 304 and 306, typically each metadata repository; ETL metadata 312, data warehouse metadata 316, OLAP metadata 320 and UI metadata 324 must be updated to reflect the new data field change. Conventionally, static data fields, also known as "flexible fields", are reserved for a limited number of added data field changes. However, this approach requires a priori knowledge of the data field count, types, and sizes which are not always available; the alternative is to statically allocate very large resources to accommodate average data field numbers and sizes. For example, a particular configuration might have fields PHONE_NUMBER NUMERIC(10) and NAME VARCHAR(128). Here the field count would be two, the types would be NUMERIC and VARCHAR, and the corresponding sizes would be 10 and 128. The metadata repositories are stored separately and human errors and inconsistencies may be made for a data field change. Additionally, if the size and number of static data fields are not used, then the business intelligence system must carry the additional resource burden of the unused fields.

A technique for propagating metadata changes for one or more business intelligence application stack elements, such as ETL 310, data warehouse 314, OLAP 318 and/or UI 322, automatically, so that data field changes are handled efficiently and correctly, is disclosed.

Figure 3B:
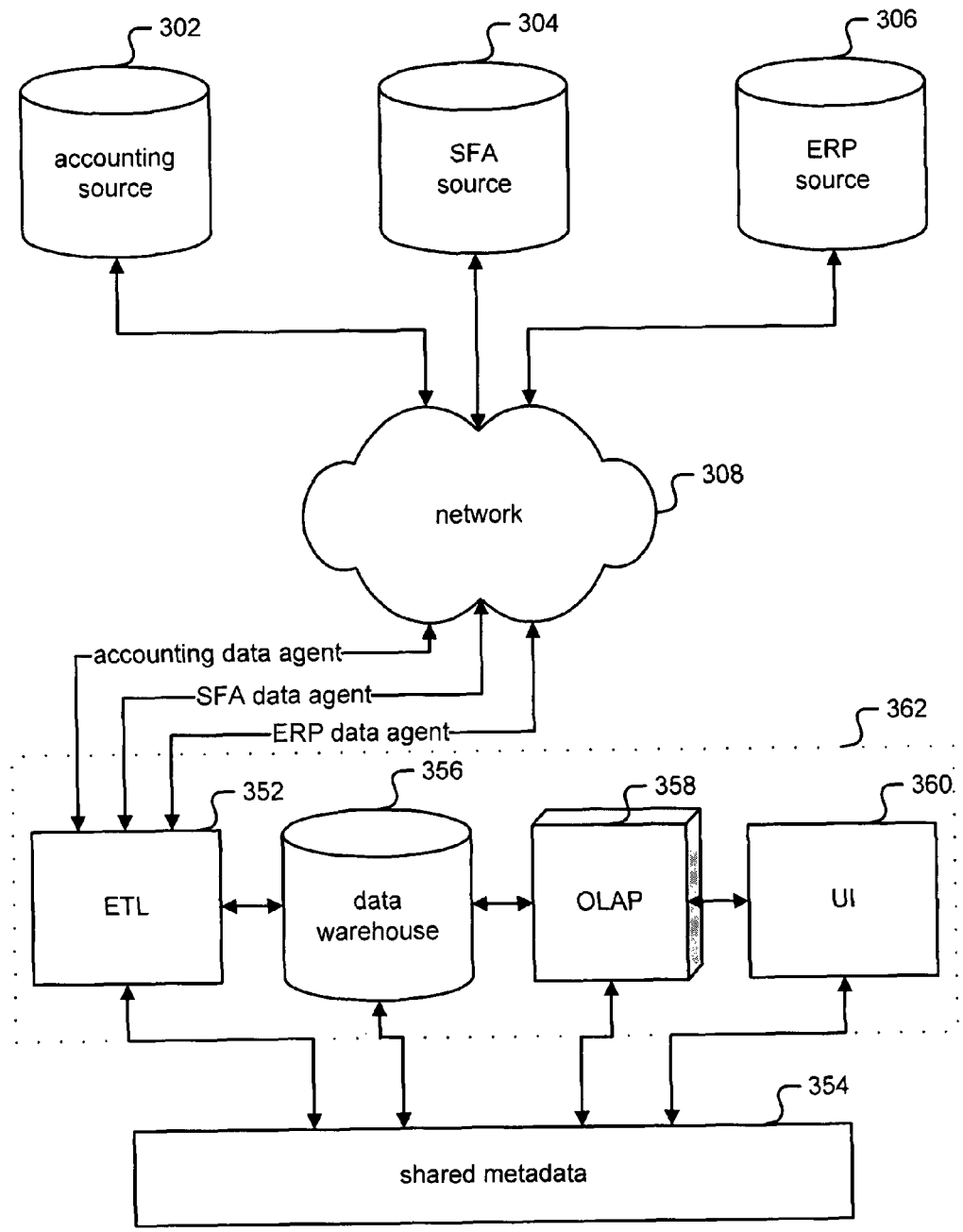
FIG. 3B is a block diagram illustrating an embodiment of a business intelligence application run-time flow.

FIG. 3B is a block diagram illustrating an embodiment of a business intelligence application run-time flow. The system in FIG. 3B may be part of the flow of FIG. 206 in FIG. 2. The sources 302, 304, and 306, and network 308 are again examples of sources connected to an ETL system 352.

In the disclosed ETL system 352, the metadata repository is a shared metadata repository 354. The shared metadata repository 354 shares metadata with other business intelligence components. Throughout this specification, "business intelligence application" or BIA refers to a set of agents and/or components configured to receive, store, integrate, process, and/or provide access to (e.g., as output, such as a report) business data from one or more sources. In the example shown in FIG. 3B, the business intelligence application includes the suite of the data agents and the four business intelligence components: ETL 352, data warehouse 356, OLAP cube 358 and UI 360. In FIG. 3B the BIA is labeled as system 362. Throughout this specification a "BIA stack element" refers to an identifiable component comprising a BIA and/or a data path associated therewith, such as the data agents or one of the four business intelligence components in the example shown in FIG. 3B: ETL 352, data warehouse 356, OLAP cube 358 or UI 360.

In comparison to FIG. 3A, the shared metadata repository 354 provides a centralized source for data field change propagation. In some embodiments, each BIA stack element may have a local metadata repository as well, but these local metadata repositories are derived automatically from the shared metadata repository 354. That is, a BIA administrator only needs to maintain the shared metadata repository 354 and not each local metadata repository. This reduces inconsistencies and errors between the BIA stack elements.

In some embodiments, the user and/or administrator have the ability in ETL 352 to define views and insert/update statements for data movement corresponding to at least one shared metadata entry in shared metadata repository 354. In some embodiments, the user and/or administrator have the ability in data warehouse 356 to create columns and tables to represent at least one shared metadata entry in shared metadata repository 354. In some embodiments, the user and/or administrator have the ability in OLAP cube 358 to categorize, summarize and aggregate data in at least one shared metadata entry in shared metadata repository 354. In some embodiments, the user and/or administrator have the ability in UI 360 to build reports using at least one shared metadata entry shared metadata repository 354 from a zero footprint web interface. In some embodiments, the user and/or administrator have the ability to incorporate a new type of BIA stack element, for example, data mining, into the auto-propagation scheme.

With a centralized shared metadata repository 354, a dynamic data field can be used that expands and contracts automatically with data field changes without the overhead of a static data field. A technique to implement a dynamic data field is disclosed.

Figure 4:
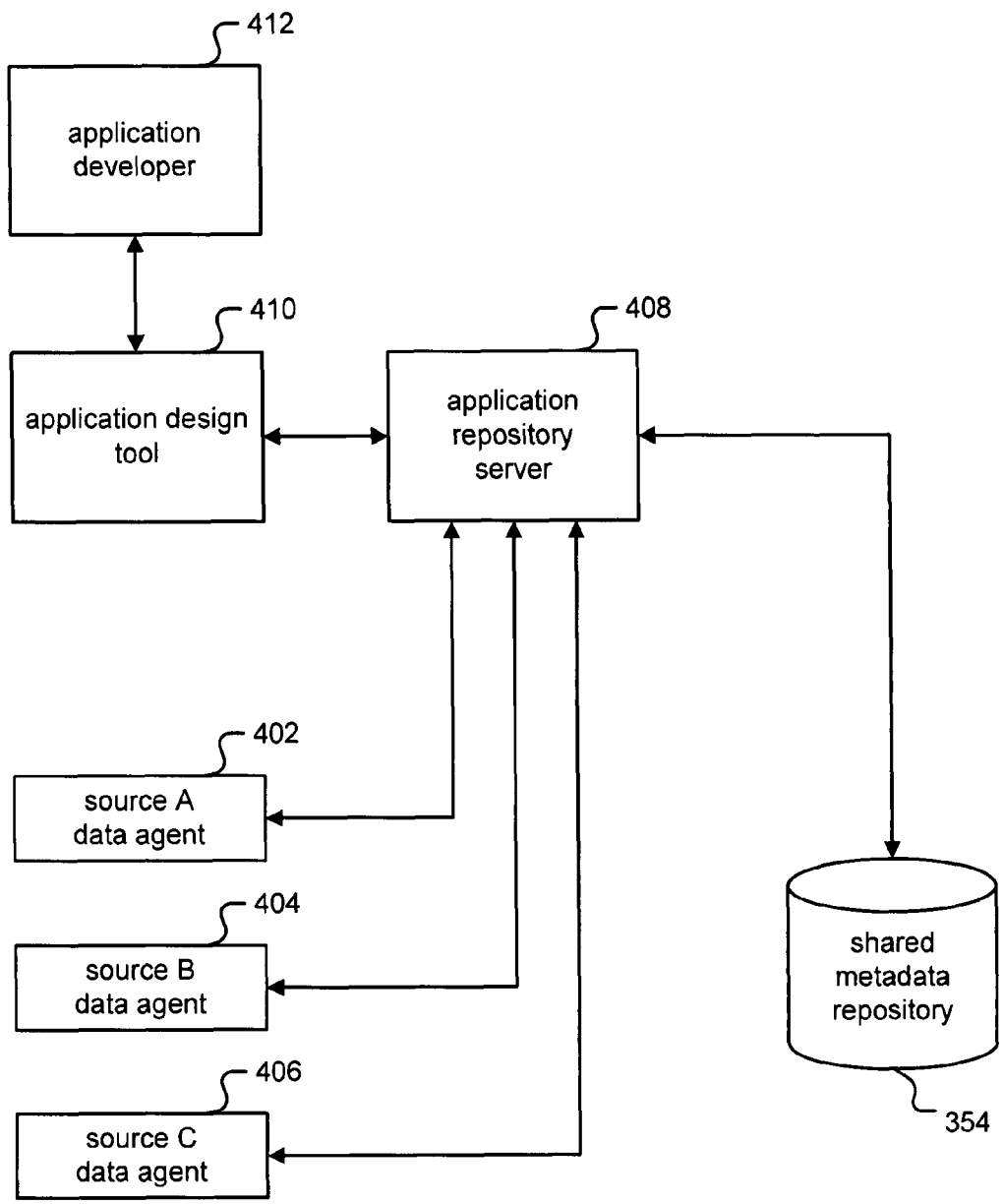
FIG. 4 is a block diagram illustrating an example of a system for a business intelligence application design flow.

FIG. 4 is a block diagram illustrating an example of a system for a business intelligence application design flow. The system in FIG. 4 may be part of the flow of FIG. 202 in FIG. 2.

Source data agents are shown as source A data agent 402, source B data agent 404 and source C data agent 406, as data agents, for example for corresponding sources 302, 304 and 306. In some embodiments there may be less than three or more than three data agents. The data agents are connected to the application repository server 408 which enables the BIA 362. In some embodiments, the server 408 may be spread across multiple physical servers. The server 408 interacts with an application developer 412, through an application design tool 410. The server 408 also is connected to the shared metadata repository 354.

Figure 5:
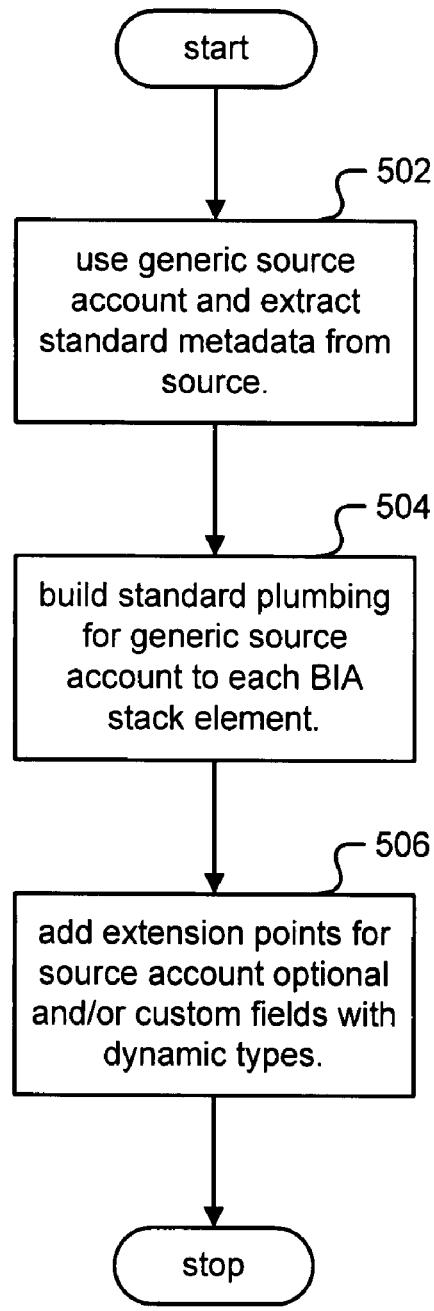
FIG. 5 is a flowchart illustrating an embodiment of a process to design a business intelligence application.

FIG. 5 is a flowchart illustrating an embodiment of a process to design a business intelligence application. The process may be implemented with application design tool 410 by application developer 412.

In step 502, a generic source account is used to extract standard metadata from each source to the repository server 408. For example, if an SFA source is used, a test or generic SFA account is set up to extract the source standard metadata without any custom data fields.

In step 504, the source standard metadata is used to provide to applicable BIA stack elements a default or initial definition of data flow connections between data fields and tables.

In step 506, the generic account is compared with the actual source account to find optional and/or custom fields. Extension points are added to the shared metadata repository 354 by using dynamic data fields. Dynamic data fields are analogous to dynamically allocated variables in programming; they allow more than one or more attributes of a new data field, such as data type or size, to be defined dynamically, rather than requiring static definition at BIA design time. In some embodiments, an administrator defines, e.g., at BIA installation, customization, or a subsequent time, how detected dynamic data fields are to be used, for example how and/or where they should be included in the data flows defined for a particular BIA installation. Examples of such uses include what, if any, intermediate processing should be done with respect to data values associated with a dynamic data field and whether/how such data should be included in reports. In some embodiments, a user interface (UI) and/or related component interacts with a human user, such as an administrator, to receive input regarding how data associated with a new field is to be used.

Figure 6:
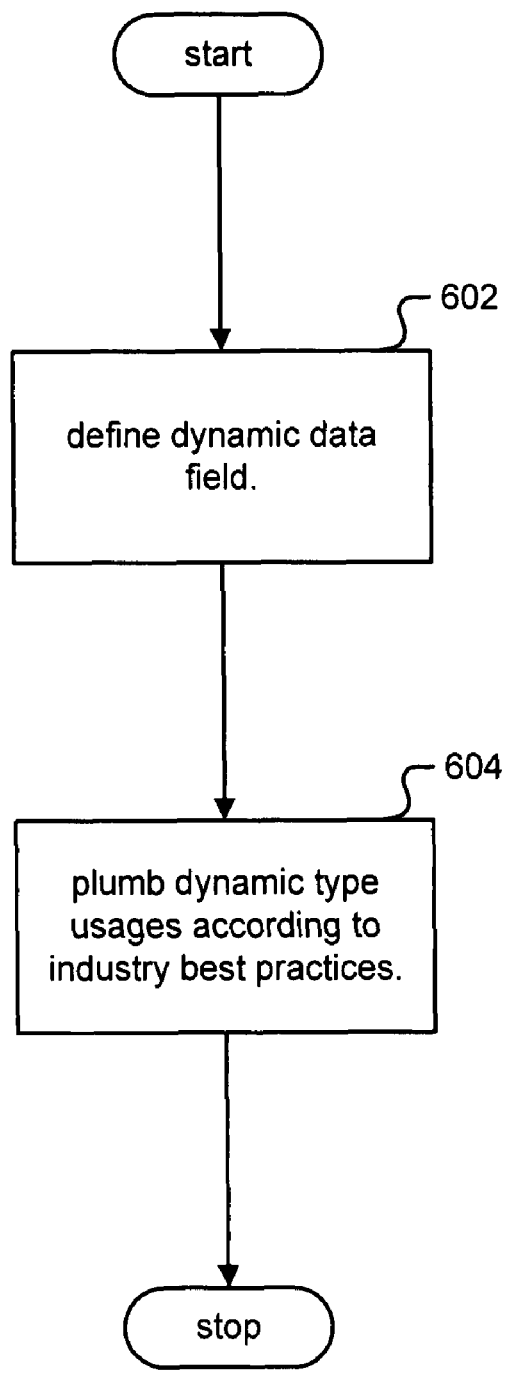
FIG. 6 is a flowchart illustrating an embodiment of a process to add extension points during the design of a business intelligence application.

FIG. 6 is a flowchart illustrating an embodiment of a process to add extension points during the design of a business intelligence application. In some embodiments, the process of FIG. 6 is included in 506 of FIG. 5. The process may be implemented with application design tool 410 by application developer 412.

In step 602, the dynamic data field is defined in each table that requires a custom or optional field. In step 604, the dynamic data fields are plumbed throughout the BIA according to industry best practices with the assistance of the application developer 412. "Industry best practices" are defined throughout this specification as practices generally accepted, through theory or experience, as safe data flow connections of these dynamic data fields. An example might be a dynamic data field with a ratings (from 1 through 10) type; a safe placement might be to average two ratings together, but an unsafe placement would be the addition of two ratings which would not make sense.

After all the dynamic data field data flow connections have been established and are verified, the design flow is complete and the BIA is ready for either configuration or run-time.

Figure 7A:
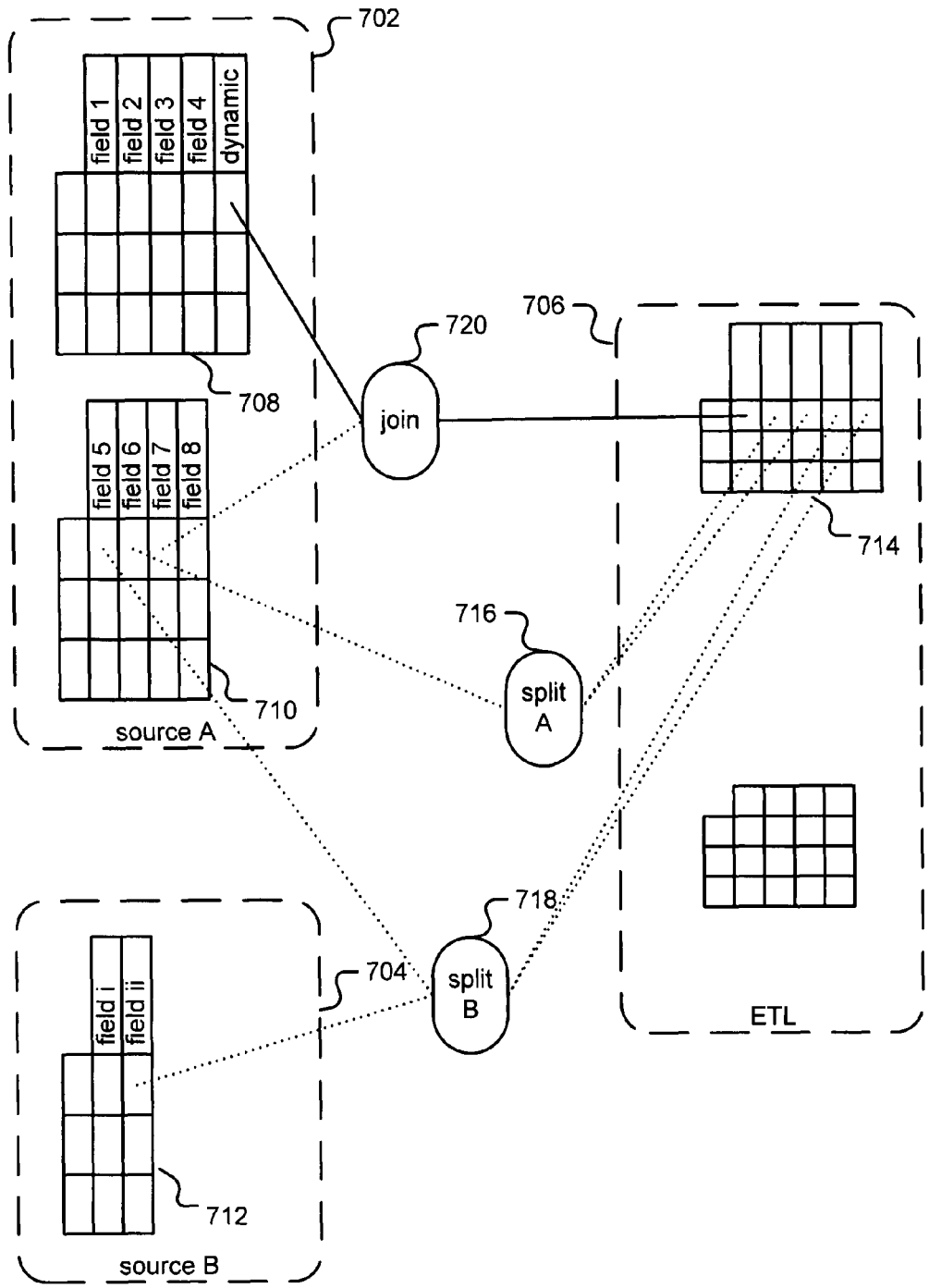
FIG. 7A is a data flow graph illustrating an example of data flow connections joining dynamic data fields from data agents in a business intelligence application.

FIG. 7A is a data flow graph illustrating an example of data flow connections joining dynamic data fields from data agents in a business intelligence application. In some embodiments, the example of FIG. 6 is part of 604 of FIG. 6. The process may be implemented with application design tool 410 by application developer 412.

For the example data flow graph in FIG. 7A, the BIA has two source databases with two source data agents, source A 702 and source B 704. The data agents 702 and 704 connect to the BIA's ETL 706. Source A 702 has two tables, table 708 and table 710. Source B 704 has one table, table 712. The ETL has multiple tables, including table 714.

With the generic template, it is determined in step 504 that Source A table 710 has a data field 6 that is split using the Split "A" 716 algorithm to two fields in ETL table 714. Similarly, Source A table 710 has a data field 5 and Source B table 712 has a field ii that when combined are re-split using the Split "B" 718 algorithm to two different fields in ETL table 714.

A dynamic data field is introduced in step 604 as part of Source A table 708. According to industry best practices, the dynamic data field can be joined using algorithm Join 720 with Source A table 710's field 7 to a field in ETL table 714. This example only shows the data flow graph between data agents and ETL, and may be continued from ETL through data warehouse, OLAP and UI. This is shown in the next figure, FIG. 7B.

Figure 7B:
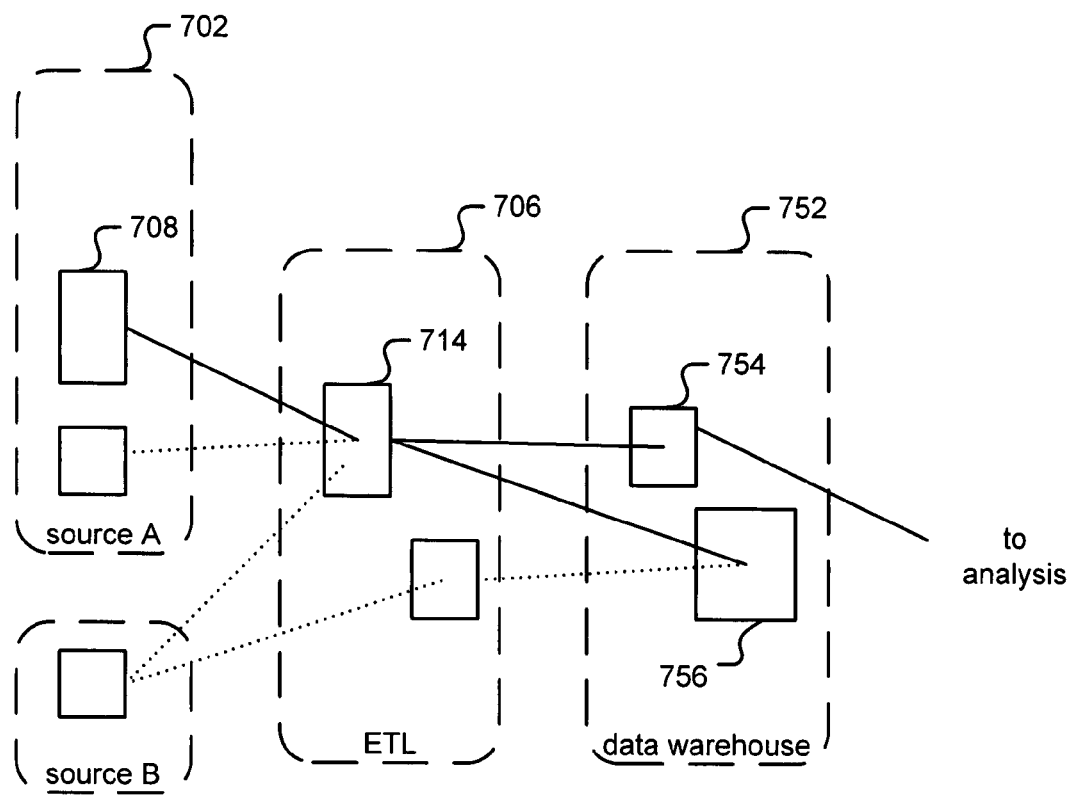
FIG. 7B is a data flow graph illustrating an example of data flow connections joining dynamic data fields in a business intelligence application.

FIG. 7B is a data flow graph illustrating an example of data flow connections joining dynamic data fields in a business intelligence application. In some embodiments, the example of FIG. 6 is part of 604 of FIG. 6. The process may be implemented with application design tool 410 by application developer 412.

As shown in FIG. 7A, Source A 702 and ETL 706 are connected through a dynamic data field from Source A table 708 to ETL table 714. At this level, the further connection to data warehouse 752 is shown as the dynamic data field is plumbed to both data warehouse table 754 and table 756 using an algorithm. The data warehouse table 754 stores the dynamic fields for use by analysis in the OLAP.

Figure 8:
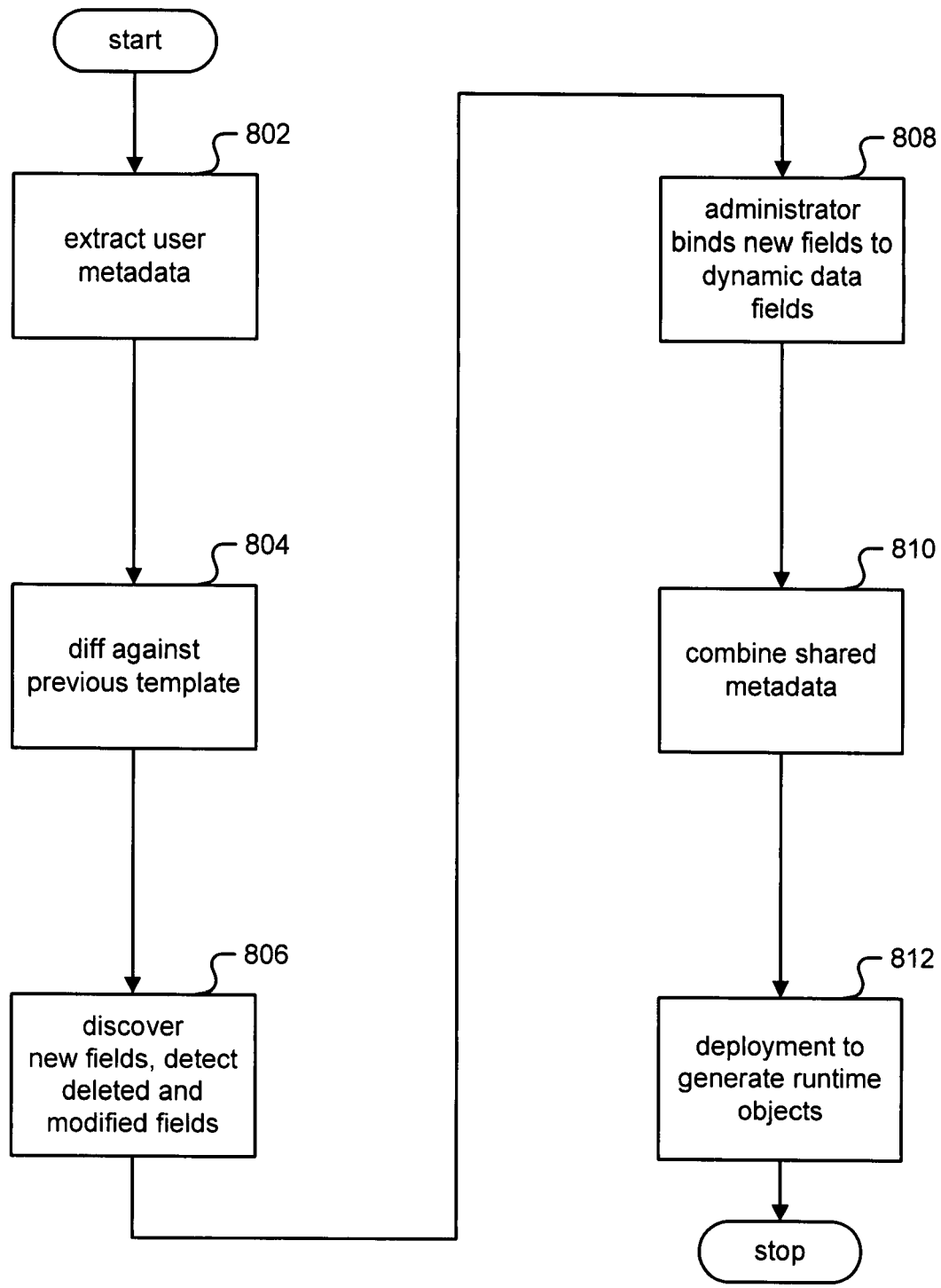
FIG. 8 is a flowchart illustrating an embodiment of a process to configure a business intelligence application.

FIG. 8 is a flowchart illustrating an embodiment of a process to configure a business intelligence application. In some embodiments, the process of FIG. 8 is included in 204 of FIG. 2. The process may be implemented with BIA 106 with an administrator.

In step 802, the administrator starts the configurator process and extracts the user metadata from each of its sources. In step 804, the differences between the current user metadata and the previous template are compared using a "diff" type tool. In some embodiments, the previous template when initially run may be the generic template of step 504.

In step 806, the discovered differences are classified as either new data fields, deleted data fields or modified data fields and presented to the administrator. In step 808, the administrator is permitted to bind the new data fields to dynamic data fields. In some embodiments, this binding may be done without the administrator's assistance.

In step 810, the union of the previous template metadata and the bindings of the configurator are combined to present new shared metadata. In step 812, the new shared metadata is deployed to generate the runtime objects such as table schema and XML files for the OLAP metadata.

The configurator flow of FIG. 8 may be run as requested by the administrator or on a scheduled basis. Running the configurator flow allows the BIA to detect a data field change from a database source and process the shared metadata to generate the BIA stack element specific metadata needed by that element to use a data value associated with the data field change.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing data, comprising:
   detecting a data field change in a received data entry received by a business intelligence application; and
   using a processor to process a shared metadata entry shared by two or more business intelligence application stack elements to derive for each of at least a subset of said two or more business intelligence application stack elements a corresponding set of element specific metadata needed by that element to use a data value associated with the data field change;

wherein detecting a data field change comprises detecting a dynamic data field; and receiving a binding data associated with the dynamic data field, wherein the binding data indicates a manner in which data associated with the dynamic data field is to be used.

2. A method as recited in claim 1, wherein the business intelligence application stack elements include one or more of the following: one or more source data agents, an Extract, Transform, Load (ETL) element, a Data Warehouse element, an Online Analytical Processing (OLAP) element, a data mining element, and a User Interface (UI) element.

3. A method as recited in claim 2, wherein source data agents connect to accounting sources, customer relationship management (CRM) sources, sales-force automation (SFA) sources or enterprise resource planning (ERP) sources.

4. A method as recited in claim 1, wherein the corresponding set of element specific metadata is represented by defining views and insert/update statements for data movement in an ETL element.

5. A method as recited in claim 1, wherein the corresponding set of element specific metadata is represented by creating columns and tables in a Data Warehouse element.

6. A method as recited in claim 1, wherein the corresponding set of element specific metadata is represented by categorizing, summarizing and aggregating data in an OLAP element.

7. A method as recited in claim 1, wherein the corresponding set of element specific metadata is represented by building reports from a zero footprint web interface in a UI element.

8. A method as recited in claim 1, further comprising adding, modifying or deleting a business intelligence application stack element from the said two or more business intelligence application stack elements.

9. A method as recited in claim 1, wherein at least one corresponding set of element specific metadata comprises a set of element specific runtime object creation commands.

10. A method as recited in claim 9, where the set of element specific runtime object creation commands include one or more of the following: database commands, table schema commands, XML commands, or OLAP metadata commands.

11. A system of processing data, including:
a processor; and
a memory coupled with the processor, wherein the memory is configured to provide the processor with instructions which when executed cause the processor to:
detect a data field change in a received data entry by a business intelligence application; and
process a shared metadata entry shared by two or more business intelligence application stack elements to derive for each of at least a subset of said two or more business intelligence application stack elements a corresponding set of element specific metadata needed by that element to use a data value associated with the data field change;
wherein detecting a data field change comprises detecting a dynamic data field; and
wherein the processor is further configured to receive a binding data associated with the dynamic data field, wherein the binding data indicates a manner in which data associated with the dynamic data field is to be used.

12. A system as recited in claim 11, wherein the business intelligence application stack elements include one or more of the following: one or more source data agents, an ETL element, a Data Warehouse element, an OLAP element, and a UI element.

13. A system as recited in claim 12, wherein source data agents connect to accounting sources, CRM sources, SFA sources or ERP sources.

14. A computer program product for processing data, the computer program product being embodied in a computer readable storage medium and comprising computer instructions for:
detecting a data field change in a received data entry by a business intelligence application; and
processing a shared metadata entry shared by two or more business intelligence application stack elements to derive for each of at least a subset of said two or more business intelligence application stack elements a corresponding set of element specific metadata needed by that element to use a data value associated with the data field change;
wherein detecting a data field change comprises detecting a dynamic data field; and
the computer program product further comprising computer instructions for receiving a binding data associated with the dynamic data field, wherein the binding data indicates a manner in which data associated with the dynamic data field is to be used.

15. A computer program product as recited in claim 14, wherein the business intelligence application stack elements include one or more of the following: one or more source data agents, an ETL element, a Data Warehouse element, an OLAP element, and a UI element.

16. A computer program product as recited in claim 15, wherein source data agents connect to accounting sources, CRM sources, SFA sources or ERP sources.

* * * * *